United States Patent Office 2,800,490
Patented July 23, 1957

2,800,490
8-HYDROXY-11-DESOXYCORTICOSTERONES

Herbert C. Murray, Hickory Corners, and Durey H. Peterson, Kalamazoo Township, Kalamazoo County, Mich., assignors to The Upjohn Company, Kalamazoo, Mich., a corporation of Michigan No Drawing. Application October 8, 1954,
Serial No. 461,284

7 Claims. (Cl. 260—397.45)

The present invention relates to steroid and is more particularly concerned with 8-hydroxy-11-desoxycorticosterone and the 21-acyloxy esters thereof represented by the following formula:

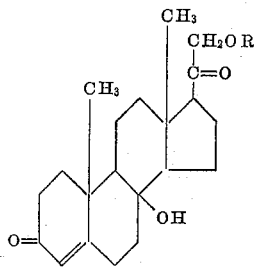

wherein R is selected from the group consisting of hydrogen and the acyl radical of a hydrocarbon carboxylic acid containing from one to eight carbon atoms, inclusive.

The 8-hydroxy-11-desoxycorticosterone is prepared by exposing 11-desoxycorticosterone or any of the 21-esters of 11-desoxycorticosterone to the oxygenating action of a fungus of the order mucorales, preferably of the family Mucoraceae and the genus Mucor in a suitable medium and with aeration as shown in detail in the examples.

In the preparation of the ester of the 8-hydroxy-11-desoxycorticosterone, the starting 8-hydroxy-11-desoxycorticosterone is admixed with an acylating agent such as, for example, ketene, a ketene of a selected acid, an acid, acid chloride, or acid bromide, or an acid anhydride, or other known acylating agent, usually in a solvent such as, for example, pyridine or the like, or in an inert solvent, including solvents like benzene, toluene, ether, and the like, and heated at a temperature between about zero degrees centigrade and the boiling point of the reaction mixture, usually about room temperature, for a period between about one half hour and about 96 hours. The time of reaction is somewhat dependent upon the temperature at which the reaction is carried out, the acylating agent, and the ratio of reactants. The reaction mixture is quenched with ice or cold water and the product is collected in an organic solvent which is thereafter washed with a mildly basic solution and water to obtain a solution of the product which is essentially neutral. In some instances, the product may be crystallized from the reaction mixture, in which event it may be advantageous to separate the product by filtration or other means, to wash it with water, and thereafter to purify it by conventional means, such as, for example, by recrystallization from a suitable solvent or by chromatographic purification, as deemed necessary.

It is an object of the present invention to provide 8-hydroxy-11-desoxycorticosterone and the 21-hydrocarbon carboxylic acid esters thereof. Other objects will be apparent to those skilled in the art to which this invention pertains.

The compounds of the present invention demonstrate pronounced anesthetic, salt retention, bacteriostatic and fungistatic activity. The compounds of the instant invention are also important as intermediates in the production of active steroids. For example, vigorous oxidation of 8-hydroxy-11-desoxycorticosterone with chromic anhydride in actic acid gives known 8-hydroxy-4-androstene-3,17-dione. The instant compound may also be used for the preparation of the known 21-hydroxy-14-pregnene-3,20-dione. This preparation may be carried out by first reducing 8-hydroxy-11-desoxycorticosterone with hydrogen in the presence of a palladium catalyst under alkaline conditions to give 8,21-dihydroxypregnane-3,20-dione which is dehydrated with methanolic hydrochloric acid to give 21-hydroxy-8(9)-pregnene-3,20-dione which can be isomerized to 21-hydroxy-14-pregnene-3,20-dione [Reichstein et al., Helv. Chim. Acta 30, 1508 (1947)] with the aid of perchloric acid in dioxane solution.

The starting material of the present invention is 11-desoxycorticosterone and the 21-esters thereof. The 21-acetate of 11-desoxycorticosterone is an already known compound [Steiger et al., Helv. Chim. Acta 20, 1164 (1937)]. While other esters may be prepared by the usual methods of esterification, such as illustrated herein, there is, however, no particular advantage in using the more expensive esters since during the 8-hydroxylation the ester group is split off from the original 11-desoxycorticosterone by the enzymatic activity of the fungus.

The following examples illustrate the process and products of this invention, but the invention is not to be construed as limited thereto.

EXAMPLE 1.—8 - HYDROXY - 11 - DESOXYCORTICOSTERONE

A medium was prepared of twenty grams of Edamine enzymatic digest of lactalbumin, three grams of corn steep liquor and 50 grams of technical dextrose diluted to one liter with water and adjusted to a pH of 4.3 to 4.5. Four stir-bottles each containing 12 liters of the sterilized medium thus prepared were inoculated with *Mucor parasiticus* (American Type Culture Collection No. 6476), and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem. 36, 504 (1944). A solution of 11 grams of desoxycorticosterone acetate dissolved in 250 milliliters of acetone was divided into four parts and one part was added to each of the four bottles containing a 24 hour growth of *Mucor parasiticus*. After an additional 24 hour period of incubation for two of the bottles the beer and mycelium were extracted. The other two bottles were incubated for 48 hours and then extracted. The mycelium was filtered, washed twice, each time with a volume of acetone approximately equal to the volume of the mycelium and extracted twice, each time with a volume of methylene chloride, approximately equal to the volume of the mycelium. The acetone and methylene chloride extracts including solvent were added to the beer filtrate. The mixed extracts and beer filtrate were extracted successively with two one-half by volume portions of methylene chloride and with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride extracts with about three to five grams of anhydrous sodium sulfate per liter of solvent and filtering, the solvent was removed by distillation. The residue was dissolved in a minimum of methylene chloride, filtered and the solvents then evaporated. The resulting residues were then combined to give 27.35 grams of solids which were dissolved in 500 milliliters of ethylene dichloride and chromatographed over 900 grams of Florisil synthetic magnesium silicate. Fractions of 1400 milliliters were collected as indicated in Table I.

Table I

| Fraction | Solvent | Eluate, grams |
|---|---|---|
| 1 | Ethylene dichloride | 3,508 |
| 2 | do | 1.319 |
| 3 | Ethylene dichloride-acetone 25:1 | 1.596 |
| 4 | do | 0.123 |
| 5 | Ethylene dichloride-acetone 15:1 | 0.212 |
| 6 | do | 1.237 |
| 7 | Ethylene dichloride-acetone 12:1 | 2.328 |
| 8 | do | 1.019 |
| 9 | do | 0.924 |
| 10 | Ethylene dichloride-acetone 10:1 | 1.045 |
| 11 | do | 1.000 |
| 12 | do | 0.803 |
| 13 | Ethylene dichloride-acetone 8:1 | 0.928 |
| 14 | do | 0.747 |
| 15 | do | 0.656 |
| 16 | Ethylene dichloride-acetone 5:1 | 0.966 |
| 17 | do | 0.817 |
| 18 | Ethylene dichloride-acetone 1:1 | 2.095 |
| 19 | do | 0.769 |
| 20 | Acetone | 0.678 |

Eluate fractions 18 and 19 were combined to give 2.665 grams of material which was dissolved in 150 milliliters of ethylene dichloride and rechromatographed over 150 grams of Florisil. Fractions of 250 milliliters were collected as shown in Table II.

Table II

| Fraction | Solvent | Eluate, milligrams |
|---|---|---|
| 1 | Ethylene dichloride | 9.5 |
| 2 | Ethylene dichloride-acetone 10:1 | 10.5 |
| 3 | do | 7.5 |
| 4 | do | 84.0 |
| 5 | Ethylene dichloride-acetone 8:1 | 214.5 |
| 6 | do | 192.0 |
| 7 | Ethylene dichloride-acetone 5:1 | 178.0 |
| 8 | do | 158.0 |
| 9 | do | 146.0 |
| 10 | Ethylene dichloride-acetone 3:1 | 478.0 |
| 11 | do | 317.0 |
| 12 | do | 188.5 |
| 13 | Ethylene dichloride-acetone 2:1 | 179.0 |
| 14 | do | 89.0 |
| 15 | do | 50.5 |
| 16 | Ethylene dichloride-acetone 1:1 | 74.5 |
| 17 | do | 60.0 |
| 18 | Acetone | 71.5 |

Eluate fractions 10 and 11, found to be crystalline after evaporation of the solvent, were combined, dissolved in ten milliliters of acetone which was then concentrated and gradually diluted with petroleum ether to effect crystallization. After two recrystallizations, 134.5 milligrams of crystals, melting point 180 to 183 degrees centigrade, were obtained. A small sample was recrystallized once more from acetone-Skellysolve B (a mixture of hexanes) to give the pure 8-hydroxy-11-desoxycorticosterone, M. P. 182.5–184°. Ultraviolet spectrum $$\lambda_{max.}^{alc.} 243 m\mu, E = 14,300, [\alpha]_D^{23} + 167°$$

Analysis.—Calculated for $C_{21}H_{30}O_4$: C, 72.80; H, 8.73. Found: C, 72.38; H, 8.64.

In a manner similar to Example 1, desoxycorticosterone was converted into 8-hydroxy-11-desoxycorticosterone by subjecting 11-desoxycorticosterone to the oxygenating action of other species of Mucor, illustratively Mucor griseo-cyanus (ATCC 1207), Mucor javanicus, Mucor hiemalis, Mucor simplex, Mucor mucedo, Mucor christianensis, Mucor dispersus, Mucor genevensis, Mucor glomerula, Mucor piriformis, Mucor racemosus, Mucor ramannianus, Mucor solani, Mucor sphaerospora, Mucor spinosus, Mucor stolonifer, other species of Mucor or species of Helicostylum such as Helicostylum piriforme (ATCC 8686, and 8992), in a nutrient medium with aeration. Isolation of the thus obtained 8-hydroxy-11-desoxycorticosterone is generally carried out by chromatography. The preferred solvent in the chromatographic procedures are methylene dichloride, ethylene dichloride, acetone and mixtures thereof.

EXAMPLE 2.—8-HYDROXY-11-DESOXYCORTICOSTERONE 21-ACETATE

A solution of 44.5 milligrams of 8-hydroxy-11-desoxycorticosterone in three milliliters of a solution of pyridine and acetic anhydride in a ratio of one to one was allowed to stand for a period of 48 hours at room temperature. Thereafter the reaction mixture was poured into ice water and the thus-obtained mixture was extracted three times with methylene dichloride. The extracts were washed once with five percent hydrochloric acid, then with five percent sodium carbonate and twice with water. Upon drying of the methylene solution over anhydrous sodium sulfate and concentrating, 52.2 milligrams of a crystalline residue were obtained which were recrystallized twice from two milliliters of acetone to which Skellysolve B was added dropwise. In this manner 37.6 milligrams of 8-hydroxy-11-desoxycorticosterone 21-acetate was obtained, melting point 212 to 215 degrees centigrade, rotation $[\alpha]_D^{23}$ plus 177 degrees at a concentration of 0.834 in chloroform.

Analysis.—Calculated for $C_{23}H_{32}O_5$: C, 71.10; H, 8.30. Found: C, 71.14; H, 8.08.

EXAMPLE 3.—8-HYDROXY-11-DESOXYCORTICOSTERONE 21-PROPIONATE

In the manner given in Example 2, 8-hydroxy-11-desoxycorticosterone was reacted with propionic anhydride in pyridine solution to yield 8-hydroxy-11-desoxycorticosterone 21-propionate.

EXAMPLE 4.—8-HYDROXY-11-DESOXYCORTICOSTERONE 21-BUTYRATE

In the manner given in Example 2, 8-hydroxy-11-desoxycorticosterone was reacted with butyric anhydride in pyridine solution to yield 8-hydroxy-11-desoxycorticosterone 21-butyrate.

EXAMPLE 5.—8-HYDROXY-11-DESOXYCORTICOSTERONE 21-VALERATE

In the manner given in Example 2, 8-hydroxy-11-desoxycorticosterone was reacted with valeric anhydride in pyridine solution to yield 8-hydroxy-11-desoxycorticosterone 21-valerate.

EXAMPLE 6.—8-HYDROXY-11-DESOXYCORTICOSTERONE 21-HEXANOATE

In the manner given in Example 2, 8-hydroxy-11-desoxycorticosterone was reacted with hexanoic anhydride in pyridine solution to yield 8-hydroxy-11-desoxycorticosterone 21-hexanoate.

EXAMPLE 7.—8-HYDROXY-11-DESOXYCORTICOSTERONE 21-BENZOATE

In the manner given in Example 2, 8-hydroxy-11-desoxycorticosterone was reacted with a solution of benzoyl chloride in pyridine to yield 8-hydroxy-11-desoxycorticosterone 21-benzoate.

EXAMPLE 8.—8-HYDROXY-11-DESOXYCORTICOSTERONE 21-TRIMETHYLACETATE

In the manner given in Example 2, 8-hydroxy-11-desoxycorticosterone was reacted with a solution of trimethylacetyl chloride in pyridine to yield 8-hydroxy-11-desoxycorticosterone 21-trimethylacetate.

EXAMPLE 9.—8 - HYDROXY - 11 - DESOXYCORTICOSTERONE 21-(β-CYCLOPENTYLPROPIONATE)

In the manner given in Example 2, 8-hydroxy-11- desoxycorticosterone was reacted with a solution of cyclopentylpropionyl chloride in pyridine to yield 8-hydroxy-11-desoxycorticosterone 21-(β-cyclopentylpropionate).

EXAMPLE 10.—8-HYDROXY-11-DESOXYCORTICOSTERONE 21-SALICYLATE

In the manner given in Example 2, 8-hydroxy-11-desoxycorticosterone was reacted with a solution of salicyloyl chloride in pyridine to yield 8-hydroxy-11-desoxycorticosterone 21-salicylate.

In a manner similar to Examples 2 through 10, inclusive, other 8-hydroxy-11-desoxycorticosterone 21-esters are obtained by reacting 8-hydroxy-11-desoxycorticosterone with esterifying agents such as acid anhydrides, acyl chlorides and acyl bromides, ketenes, free acids, propenyl acylates and other acylating agents in pyridine, benzene, toluene or ether solutions. Such 8-hydroxy-11-desoxycorticosterone 21-esters prepared as shown in Examples 2 through 10 and within the purview of this invention include one to eight carbon atom carboxylic acid acyloxy esters of saturated or unsaturated, aliphatic, carbocyclic or cycloaliphatic, aryl, arylalkyl, alkaryl, mono-, di- or polycarboxylic acid esters such as the 8-hydroxy-11-desoxycorticosterone 21-formate, isovalerate, heptanoate, octanoate, cyclohexylformate, toluate, anisate, gallate, phenylacetate, cinnamate, vinylacetate, dimethylacetate, hemisuccinate, hemitartrate, dihydrogencitrate, glutarate, maleate, malonate, and the like.

It is to be understood that the invention is not to be limited to the exact details or exact compounds shown and described, as obvious modifications and equivalents will be apparent to one skilled in the art, and the invention is therefore to be limited only by the scope of the appended claims.

We claim:

1. An 8-hydroxy-11-desoxycorticosterone of the formula:

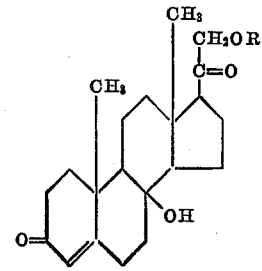

wherein R is selected from the group consisting of hydrogen and the acyl group of a hydrocarbon carboxylic acid containing from one to eight carbon atoms, inclusive.

2. 8-Hydroxy-11-desoxycorticosterone.

3. 8-Hydroxy-11-desoxycorticosterone 21-esters of the formula:

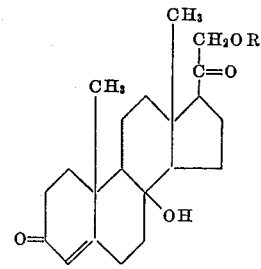

wherein R is the acyl radical of a hydrocarbon carboxylic acid containing from one to eight carbon atoms, inclusive.

4. 8-Hydroxy-11-desoxycorticosterone 21-acetate.
5. 8-Hydroxy-11-desoxycorticosterone 21-propionate.
6. 8-Hydroxy-11-desoxycorticosterone 21-(β-cyclopentylpropionate).
7. 8-Hydroxy-11-desoxycorticosterone 21-benzoate.

References Cited in the file of this patent
UNITED STATES PATENTS 2,602,769      Murray et al. _____ July 8, 1952